US009643207B1

(12) United States Patent
Guy

(10) Patent No.: US 9,643,207 B1
(45) Date of Patent: May 9, 2017

(54) PAINT ROLLER DRILL ATTACHMENT

(71) Applicant: Anthony Guy, Sea Cliff, NY (US)

(72) Inventor: Anthony Guy, Sea Cliff, NY (US)

(*) Notice: Subject to any disclaimer, the term of this patent is extended or adjusted under 35 U.S.C. 154(b) by 0 days.

(21) Appl. No.: 14/810,638

(22) Filed: Jul. 28, 2015

(51) Int. Cl.
*F26B 5/08* (2006.01)
*B05C 17/02* (2006.01)
*B44D 3/00* (2006.01)
*B23B 31/00* (2006.01)

(52) U.S. Cl.
CPC ........ *B05C 17/0245* (2013.01); *B23B 31/001* (2013.01); *B44D 3/006* (2013.01); *B23B 2231/04* (2013.01)

(58) Field of Classification Search
CPC ... F26B 5/00; F26B 5/08; A46B 17/00; A46B 17/06
USPC .................................... 34/58, 59, 60; 134/33
See application file for complete search history.

(56) References Cited

U.S. PATENT DOCUMENTS 2,931,661 A * 4/1960 Harris .................... A46B 17/06 134/157
3,925,908 A 12/1975 Dunn
4,759,384 A 7/1988 Kliewer
5,185,938 A * 2/1993 Hutt ....................... A46B 17/06 15/246
5,588,221 A * 12/1996 Hoeltke ................. A46B 17/06 34/58
5,621,979 A * 4/1997 Taylor .................... A46B 13/02 248/522
5,630,284 A * 5/1997 Huang ................... A46B 17/06 192/109 R
5,784,798 A * 7/1998 Taylor .................... B44D 3/006 285/346
5,937,534 A * 8/1999 Anderson .............. B44D 3/006 34/58
6,038,787 A * 3/2000 Dean ...................... A46B 17/06 134/140
6,073,362 A * 6/2000 Dean ...................... B44D 3/006 34/58
6,088,933 A * 7/2000 Mallalieu .................. F26B 5/08 148/529
6,163,975 A * 12/2000 Michelsen ............. A46B 17/02 34/58
6,902,315 B2 * 6/2005 Hutchinson ............. B01F 7/001 366/129
8,166,665 B2 * 5/2012 Potgeter ................. A46B 17/06 34/240
8,910,645 B2 * 12/2014 Piccioni ................. A46B 17/06 134/149
2009/0293918 A1 12/2009 Wikman
(Continued)

FOREIGN PATENT DOCUMENTS

WO WO2008094266 B1 12/2008

*Primary Examiner* — Stephen M Gravini

(57) ABSTRACT

The paint roller drill attachment is a device that enables a paint roller to be secured thereon. Moreover, the paint roller drill attachment includes a hexagonal drill bit that is adapted to be secured to a drill chuck of a drill in order to rotate both the paint roller drill attachment as well as the paint roller. Moreover, high-speed rotation of the paint roller drill attachment via the drill enables wet paint to be spun off of the paint roller. The paint roller drill attachment includes a paint roller portion that is affixed to the hexagonal drill bit. The paint roller portion includes a plurality of rib members that span between a first member and a second member.

6 Claims, 5 Drawing Sheets

(56) References Cited

U.S. PATENT DOCUMENTS

| | | | | |
|---|---|---|---|---|
| 2010/0263691 | A1* | 10/2010 | Fresquez ............... | B05C 17/024 134/33 |
| 2012/0118333 | A1 | 5/2012 | Piccioni | |
| 2015/0202660 | A1* | 7/2015 | Ciaschi .................. | B44D 3/006 134/33 |

* cited by examiner

PAINT ROLLER DRILL ATTACHMENT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of painting tools, more specifically, a tool that is adapted to interface between a drill and a paint roller with wet paint in order to aid in cleaning the paint roller.

SUMMARY OF INVENTION

The paint roller drill attachment is a device that enables a paint roller to be secured thereon. Moreover, the paint roller drill attachment includes a hexagonal drill bit that is adapted to be secured to a drill chuck of a drill in order to rotate both the paint roller drill attachment as well as the paint roller. Moreover, high-speed rotation of the paint roller drill attachment via the drill enables wet paint to be spun off of the paint roller. The paint roller drill attachment includes a paint roller portion that is affixed to the hexagonal drill bit. The paint roller portion includes a plurality of rib members that span between a first member and a second member.

These together with additional objects, features and advantages of the paint roller drill attachment will be readily apparent to those of ordinary skill in the art upon reading the following detailed description of the presently preferred, but nonetheless illustrative, embodiments when taken in conjunction with the accompanying drawings.

In this respect, before explaining the current embodiments of the paint roller drill attachment in detail, it is to be understood that the paint roller drill attachment is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the paint roller drill attachment.

It is therefore important that the claims be regarded as including such equivalent construction insofar as they do not depart from the spirit and scope of the paint roller drill attachment. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
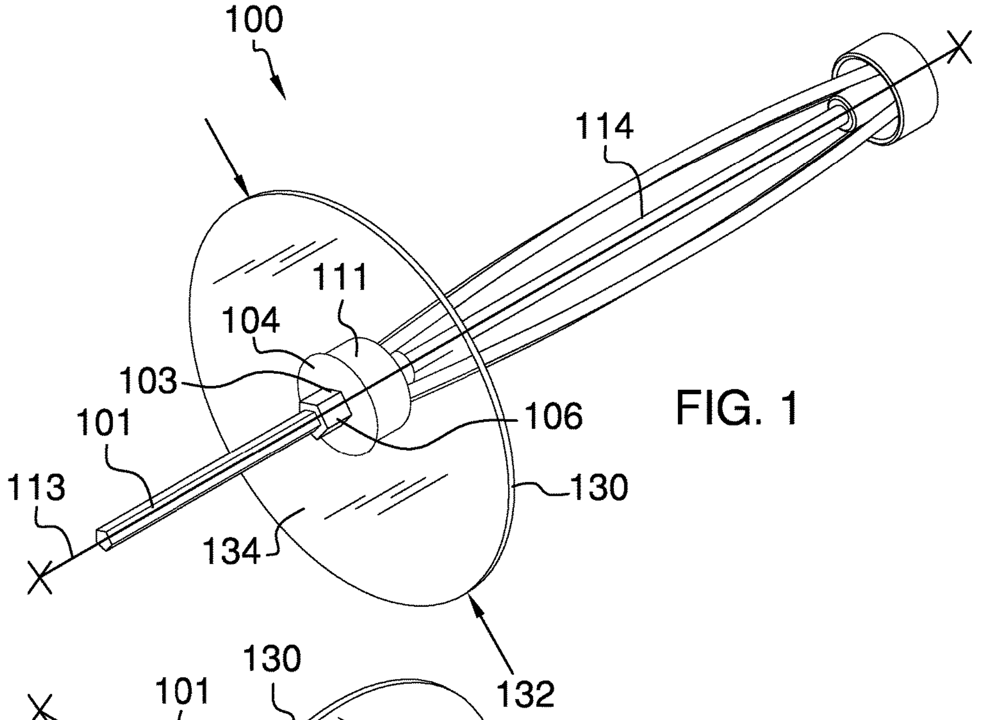
FIG. 1 is a perspective view of an embodiment of the disclosure.
Figure 2:
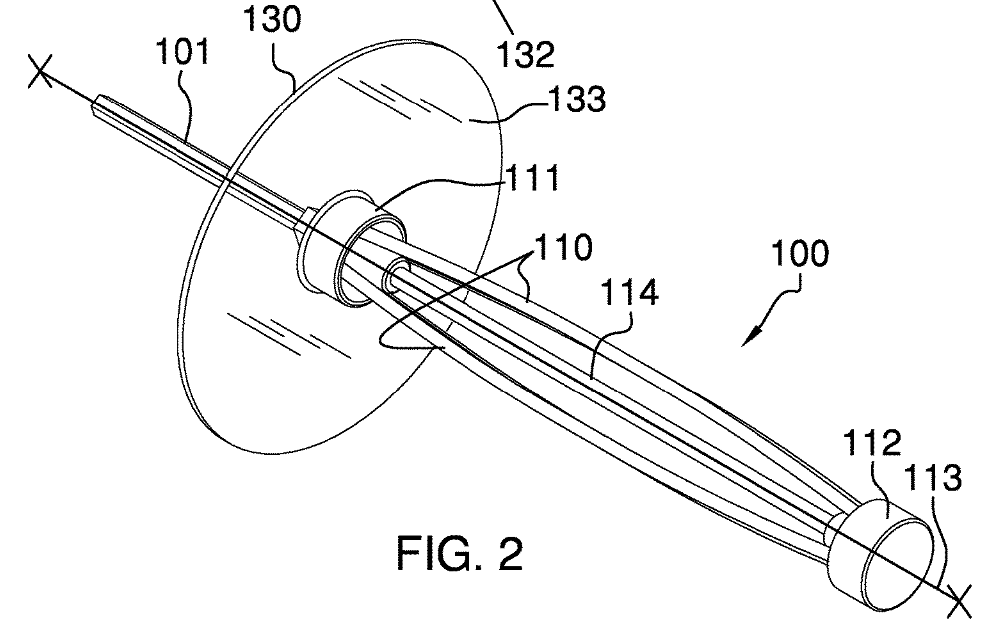
FIG. 2 is a second, perspective view of an embodiment of the disclosure.
Figure 3:
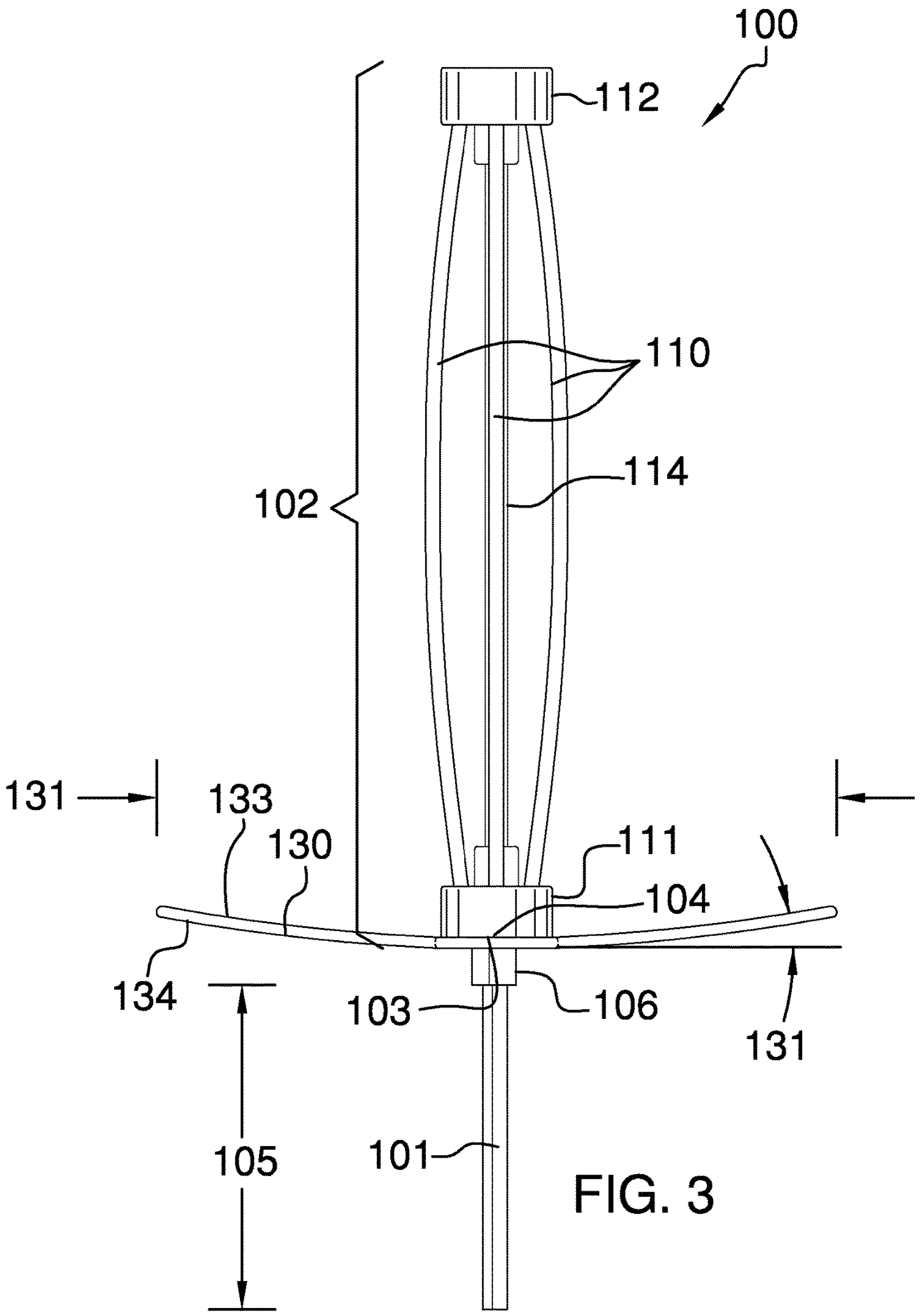
FIG. 3 is a front view of an embodiment of the disclosure across 3-3.
Figure 4:
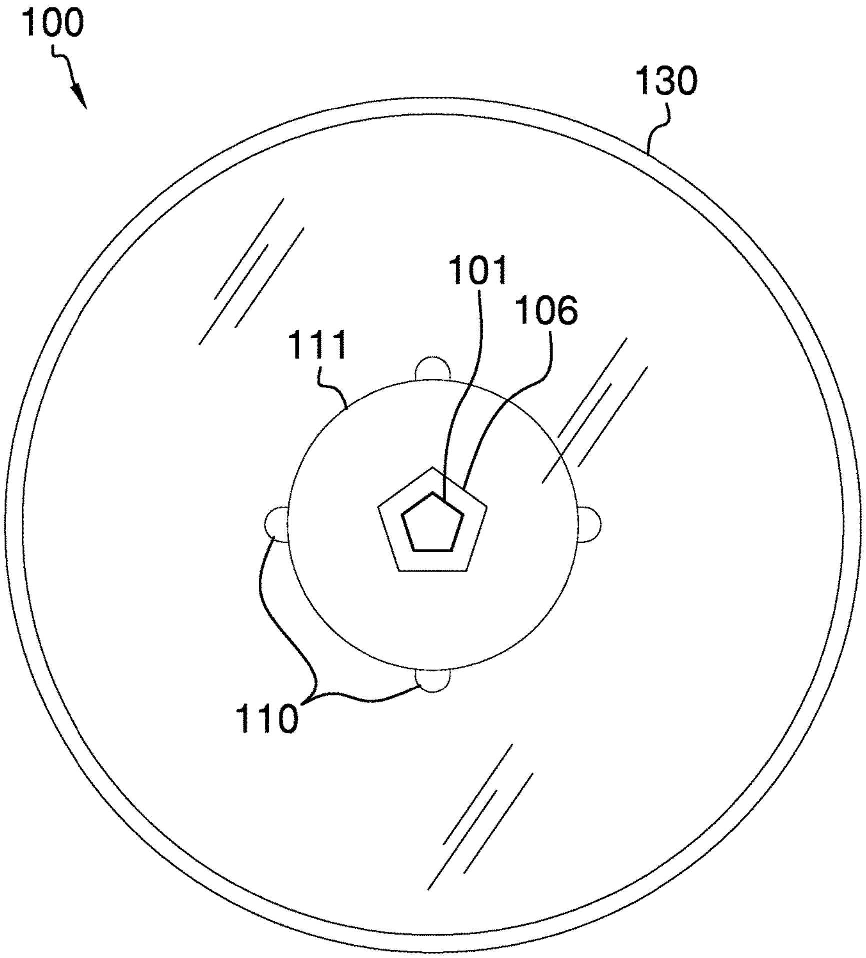
FIG. 4 is a side view of an embodiment of the disclosure.

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6. The paint roller drill attachment 100 (hereinafter invention) comprises a hexagonal drill bit 101, and a paint roller portion 102. The hexagonal drill bit 101 is affixed to the paint roller portion 102. Moreover, a first bit end 103 of the hexagonal drill bit 101 is affixed to a first roller end 104 of the paint roller portion 102.

Figure 5:
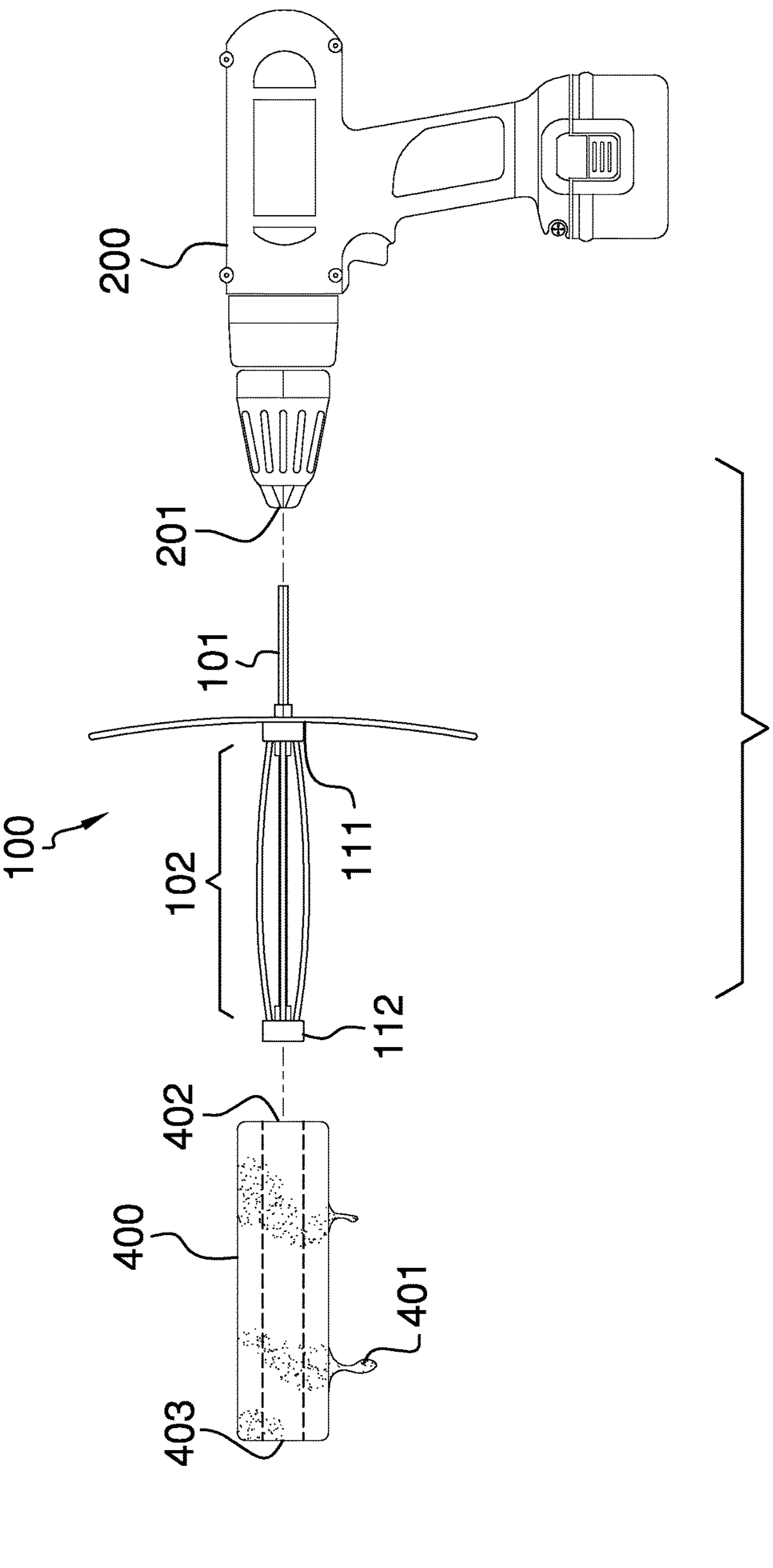
FIG. 5 is an exploded view of an embodiment of the disclosure with a wet paint roller and a drill.
Figure 6:
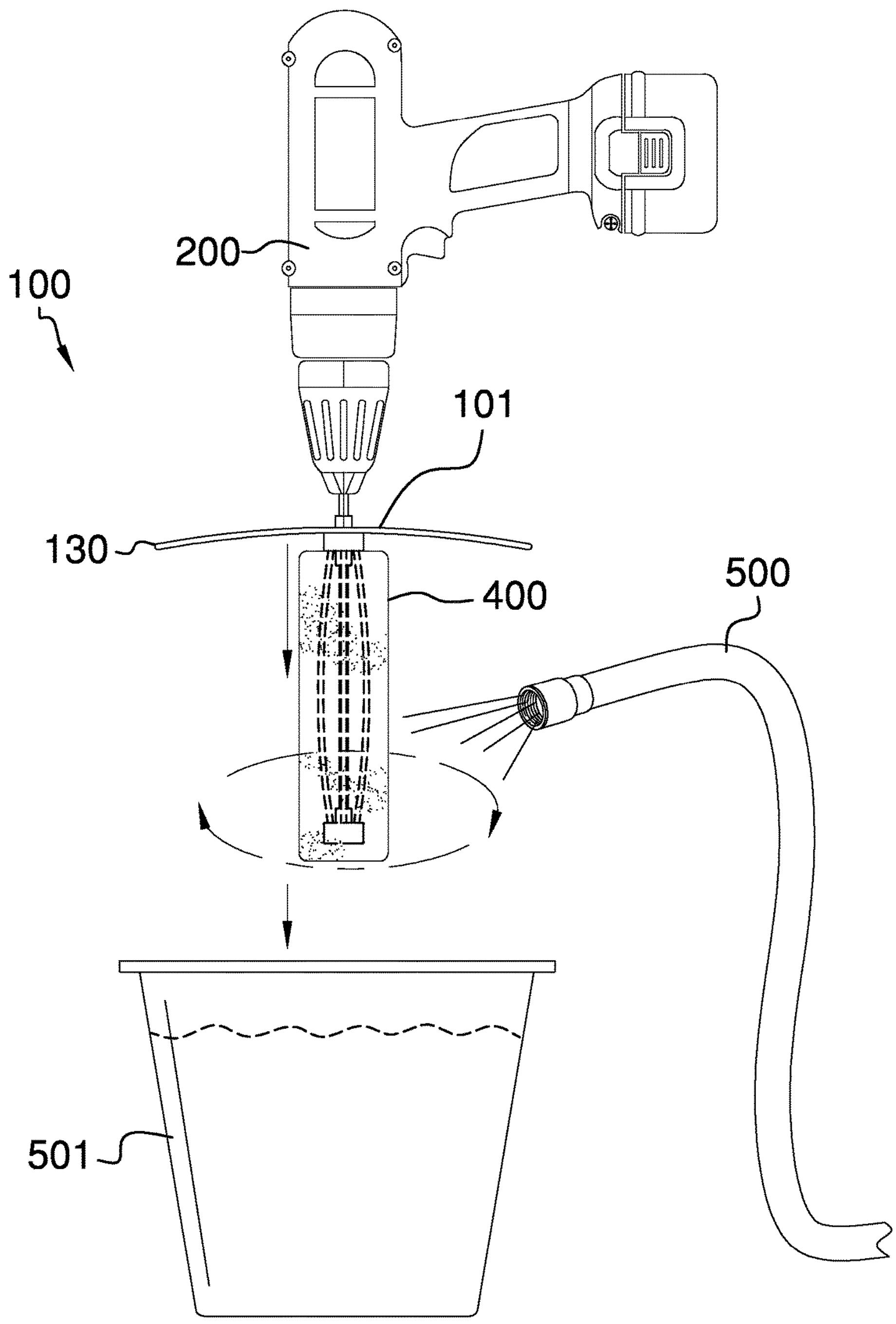
FIG. 6 is a view of an embodiment of the disclosure in use with a water source.

The hexagonal drill bit 101 has a hexagonal cross-section, and is adapted to be inserted into a drill chuck 201 of a drill 200. Moreover, the drill chuck 201 of the drill 200 secures the hexagonal drill bit 101 thereto. The drill chuck 201 of the drill 200 secures the invention 100 thereon. The hexagonal drill bit 101 may be further defined with a bit length 105. The bit length 105 may range from not less than 1 inch, but not greater than 4 feet. As depicted in FIG. 5, the hexagonal drill bit 101 may have the bit length 105 at 4 to 5 inches. However, different bit lengths 105 may be employed to provide enhanced use of the invention 100.

The hexagonal drill bit 101 is depicted with a hexagonal shoulder 106. The hexagonal shoulder 106 is where the first bit end 103 is located. The hexagonal shoulder 106 interfaces with the paint roller portion 102. The paint roller portion 102 extends from the hexagonal drill bit 101 at the hexagonal shoulder 106. It shall be noted that the hexagonal shoulder 106 does not rotate relative to either the paint roller portion 102 and the hexagonal drill bit 101.

The paint roller portion 102 is constructed of a plurality of rib members 110 that extend between a first roller member 111 and a second roller member 112. The first roller member 111 interfaces with the first bit end 103 of the hexagonal drill bit 101. The second roller member 112 is opposite of the first roller member 111.

The plurality of rib members 110 are concentrically oriented along a first axis 113. Moreover, a central roller bar 114 extends between the first roller member 111 and the second roller member 112. The central roller bar 114 is concentrically oriented along the first axis 113. The plurality of rib members 110 are symmetrically arranged around the central roller bar 114. The central roller bar 114 is affixed to the hexagonal drill bit 101.

The paint roller portion 102 is adapted to receive a paint roller 400 thereon. Moreover, the paint roller portion 102 is adapted to receive the paint roller 400 thereon such that the drill 200 is able to spin both the invention 100 and the paint roller 400 at a speed capable of removing paint 401. It shall be noted, that the invention 100 is ideally used with either a garden hose 500 or a bucket of water 501 in order to aid in removing paint 401 from the paint roller 400. It shall be further noted that the invention 100 is subsequently used to dry off the paint roller 400 after all paint 401 is removed.

The paint roller 400 slides onto the paint roller portion 102. Moreover, the paint roller 400 slides over the second roller member 112. The paint roller 400 rests against the first roller member 111. A first roller end 402 of the paint roller 400 lies adjacent the first roller member 111; whereas a second roller end 403 of the paint roller 400 lies adjacent the second roller member 112.

A splatter shield 130 may be included with the invention 100. Moreover, the splatter shield 130 is positioned adjacent the hexagonal shoulder 106. The splatter shield 130 is used to prevent water and/or paint from spraying upwardly when the invention 100 in use. The splatter shield 130 is positioned at the first bit end 103 of the hexagonal drill bit 101 and the first roller end 104 of the paint roller portion 102. The splatter shield is a disc-shaped object that may include a shield curvature 131 across a shield diameter 132. The shield diameter 132 being not less than 3 inches. The splatter shield 130 may be translucent, and is ideally made of a plastic. The splatter shield 130 is also defined with an inner shield surface 133 and an outer shield surface 134. The inner shield surface 133 faces the first roller member 111.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A paint roller drill attachment comprising:
- a hexagonal drill bit adapted to be secured to a drill chuck of a drill;
- wherein a paint roller portion extends from the hexagonal drill bit;
- wherein the paint roller portion is adapted to receive a paint roller thereon;
- wherein the drill is able to spin the paint roller as well as the paint roller portion and the hexagonal drill bit in order to remove wet paint and/or dry off water from a cleaned paint roller;
- wherein the hexagonal drill bit is affixed to the paint roller portion;
- wherein a first bit end of the hexagonal drill bit is affixed to a first roller end of the paint roller portion;
- wherein the hexagonal drill bit has a hexagonal cross-section, and is adapted to be inserted into the drill chuck of the drill;
- wherein the drill chuck of the drill secures the hexagonal drill bit thereto;
- wherein the hexagonal drill bit is further defined with a bit length;
- wherein the bit length ranges from not less than 1 inch, but not greater than 4 feet;
- wherein the hexagonal drill bit includes a hexagonal shoulder;
- wherein the hexagonal shoulder is where the first bit end is located;
- wherein the hexagonal shoulder interfaces with the paint roller portion;
- wherein the paint roller portion extends from the hexagonal drill bit at the hexagonal shoulder;
- wherein the paint roller portion is constructed of a plurality of rib members that extend between a first roller member and a second roller member;
- wherein the first roller member interfaces with the first bit end of the hexagonal drill bit;
- wherein the second roller member is opposite of the first roller member;
- wherein the plurality of rib members are concentrically oriented along a first axis;
- wherein a central roller bar extends between the first roller member and the second roller member;
- wherein the central roller bar is concentrically oriented along the first axis;
- wherein the plurality of rib members are symmetrically arranged around the central roller bar;
- wherein the central roller bar is affixed to the hexagonal drill bit;
- wherein the paint roller portion is adapted to receive the paint roller thereon; wherein the paint roller portion and the paint roller are used with either a garden hose or a bucket of water in order to aid in removing paint from the paint roller.

2. The paint roller drill attachment according to claim 1 wherein the paint roller is adapted to slide onto the paint roller portion; wherein the paint roller slides over the second roller member; wherein the paint roller rests against the first roller member.

3. The paint roller drill attachment according to claim 2 wherein a first roller end of the paint roller lies adjacent the first roller member; wherein a second roller end of the paint roller lies adjacent the second roller member.

4. The paint roller drill attachment according to claim 3 wherein a splatter shield is positioned adjacent the hexagonal shoulder; wherein the splatter shield is used to prevent water and/or paint from spraying upwardly when the paint roller drill attachment is in use.

5. The paint roller drill attachment according to claim 4 wherein the splatter shield is positioned at the first bit end of the hexagonal drill bit and the first roller end of the paint roller portion; wherein the splatter shield is a disc-shaped object that is further defined with a shield curvature across a shield diameter.

6. The paint roller drill attachment according to claim 5 wherein the splatter shield is translucent; wherein the splatter shield is defined with an inner shield surface and an outer shield surface; wherein the inner shield surface faces the first roller member.

* * * * *